(No Model.)

A. RING.
SAP SPOUT.

No. 599,633. Patented Feb. 22, 1898.

Witnesses
Inventor
Augustin Ring
by Alexander & Dowell
his Attorneys

UNITED STATES PATENT OFFICE.

AUGUSTIN RING, OF FISHER, ILLINOIS.

SAP-SPOUT.

SPECIFICATION forming part of Letters Patent No. 599,633, dated February 22, 1898.

Application filed August 14, 1897. Serial No. 648,219. (No model.)

*To all whom it may concern:*

Be it known that I, AUGUSTIN RING, of Fisher, in the county of Champaign and State of Illinois, have invented certain new and useful Improvements in Sap-Spouts; and I hereby declare that the following is a full, clear, and exact description thereof, reference being had to the accompanying drawings, which form part of this specification.

This invention is an improvement in sap-spouts for collecting sap from trees; and its object is to provide a combined spout and bucket-holder of simple and durable construction which can be readily fastened to trees containing the sap to be drawn.

The invention therefore consists in the novel construction of the device and combination of parts therein, as will be hereinafter described and claimed and as illustrated in the accompanying drawings, in which—

Figure 1:
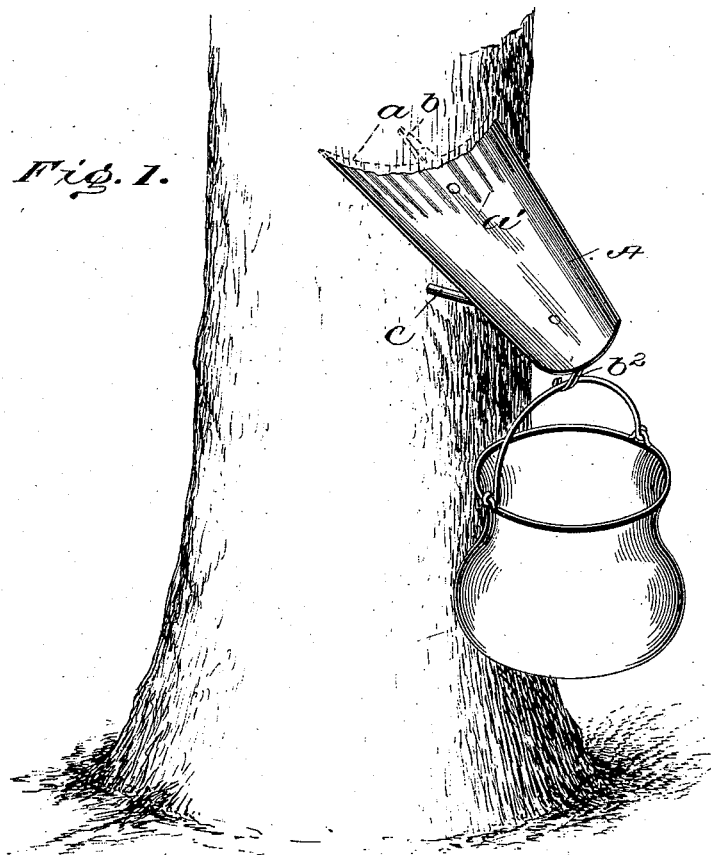
Figure 2:
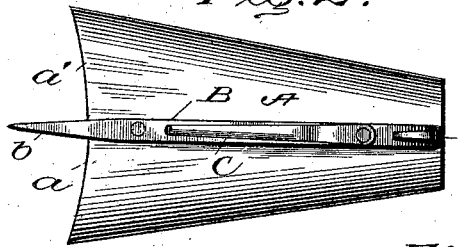
Figure 3:
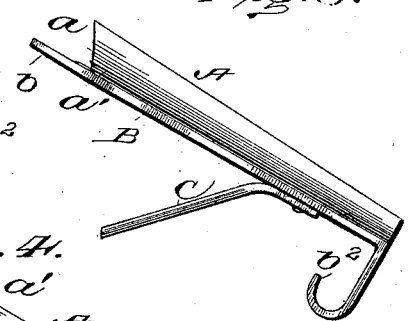
Figure 4:
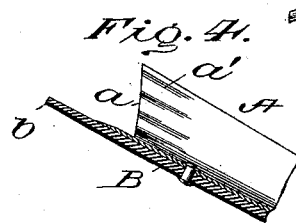

Figure 1 is a perspective view of the improved sap-spout and bucket-holder attached to a tree. Fig. 2 is a bottom plan view thereof detached. Fig. 3 is a side view, and Fig. 4 a detail longitudinal section of the upper end of the spout.

The spout or conveying portion A is made of any suitable material, preferably of galvanized iron or steel, and is concavo-convex in cross-section, with the concavity uppermost, and one end is broader than the other and so shaped as to form a substantially concave edge $a$, adapted to fit closely against a tree when the spout is placed at the proper angle and secured thereto. This edge $a$ is beveled or sharpened, as shown, to constitute a cutting edge for the purpose hereinafter described. In the upper surface of the spout, at the end $a$ thereof, are short longitudinally-disposed grooves $a'$ for facilitating the collection of sap.

The spout A is fixed upon a bar B, which extends longitudinally and centrally under the spout, the rear end of the bar projecting beyond the end $a$ of the spout and be reduced to a sharp stud $b$, which is adapted to penetrate into the wood of a tree, thereby fastening the spout thereto. The outer or front end of bar B is bent downward to form a hook $b^2$, as shown, adapted to suspend a bucket or other suitable receiving vessel under the outer end of the spout.

To brace the spout in position securely and prevent stud $b$ pulling out when a bucket is hung on the hook, brace-rod C is secured to bar B near the front end thereof and extends downward and rearward, so that its lower end will rest firmly against the side of the tree when the spout is in position, as shown in Fig. 1, thereby supporting the outer end of the spout and preventing the stud from casually pulling out.

To attach the device to a tree, the stud $b$ is driven into the bark at the desired point by hammering upon the outer end of bar B or the hook $b^2$, or in other suitable manner, and the beveled edge $a$ of the spout is likewise driven through the bark of the tree, thereby forming a perfect collector for the sap, which will escape freely into the spout by reason of the grooves $a'$, formed on the upper surface thereof. The exuding sap is caught in a bucket or other suitable receptacle hung upon the hook $b^2$, the weight thereof being supported by the brace-rod C.

Having thus described my invention, what I therefore claim as new, and desire to secure by Letters Patent thereon, is—

1. A sap-spout having an inner cutting edge provided with longitudinally-disposed grooves to facilitate the flow of sap, substantially as specified.

2. The combination of the sap-spout having an inner cutting edge and stud; with a brace for the spout, substantially as described.

3. A sap-spout having an inner cutting edge provided with longitudinally-disposed grooves to facilitate the flow of sap; with an inclined brace-rod attached thereto, for the purpose and substantially as described.

4. The combination of the sap-spout having a concaved cutting edge, and a supporting-bar therefor having a stud on one end and a hook on the other, substantially as set forth.

5. The combination of the sap-spout having a concaved cutting edge, and a supporting-bar therefor having a stud on one end and a hook on the other; with a brace-rod attached to said bar near the hooked end thereof, all substantially as and for the purpose set forth.

In testimony that I claim the foregoing as my own I affix my signature in presence of two witnesses.

AUGUSTIN RING.

In presence of—
SPENCER M. WHITE,
SEPTIMUS FISHER.